United States Patent
Böhler

(10) Patent No.: US 10,495,256 B2
(45) Date of Patent: Dec. 3, 2019

(54) ACCESS CONTROL SYSTEM

(71) Applicant: SICK AG, Waldkirch (DE)

(72) Inventor: Frank Böhler, Waldkirch (DE)

(73) Assignee: SICK AG, Waldkirch (DE)

( * ) Notice: Subject to any disclaimer, the term of this patent is extended or adjusted under 35 U.S.C. 154(b) by 71 days.

(21) Appl. No.: 15/978,768

(22) Filed: May 14, 2018

(65) Prior Publication Data

US 2018/0347753 A1 Dec. 6, 2018

(30) Foreign Application Priority Data

Jun. 6, 2017 (DE) .......................... 10 2017 112 419

(51) Int. Cl.
*F16P 3/14* (2006.01)
*G01V 8/12* (2006.01)
*G01S 17/02* (2006.01)

(52) U.S. Cl.
CPC ............ *F16P 3/144* (2013.01); *G01S 17/023* (2013.01); *G01S 17/026* (2013.01); *G01V 8/12* (2013.01)

(58) Field of Classification Search
CPC ...... F16P 3/144; G01S 17/023; G01S 17/026; G01S 17/42; G01V 8/12; G01V 8/20; G07C 9/00126; G08B 13/194
USPC ........................................... 250/221
See application file for complete search history.

(56) References Cited

U.S. PATENT DOCUMENTS

| 5,903,355 A * | 5/1999 | Schwarz ............... G01S 17/026 356/394 |
| 8,107,058 B2 * | 1/2012 | Stein ..................... B25J 9/1674 356/27 |
| 2011/0109456 A1 | 5/2011 | Bergman et al. |

FOREIGN PATENT DOCUMENTS

| DE | 4411448 A1 | 10/1995 |
| DE | 4422497 C2 | 6/1996 |
| DE | 19523843 C1 | 1/1997 |
| DE | 102004044973 A1 | 3/2006 |
| DE | 102008004941 A1 | 8/2009 |
| DE | 102011110132 A1 | 2/2013 |

(Continued)

OTHER PUBLICATIONS

German Search Report dated Jan. 16, 2018 corresponding to application No. 102017112419.5.

*Primary Examiner* — Seung C Sohn
(74) *Attorney, Agent, or Firm* — Nath, Goldberg & Meyer; Jerald L. Meyer

(57) ABSTRACT

The present invention relates to an access control system for the monitoring of the access of objects to a monitored zone and comprises
at least one first optoelectronic sensor that is configured for the recognition of a penetration of an object into the monitored zone;
at least one second optoelectronic sensor that is configured for the spatially resolving monitoring of a forefield disposed in front of the monitored zone;
and an evaluation unit that is in signal communication with the first and second sensors, with the evaluation unit being configured to trigger a safety function on the penetration of an object into the monitored zone and being configured to suppress the safety function when the penetrating object is classified as a permitted object.

13 Claims, 4 Drawing Sheets

(56) References Cited

FOREIGN PATENT DOCUMENTS

Figure 1:
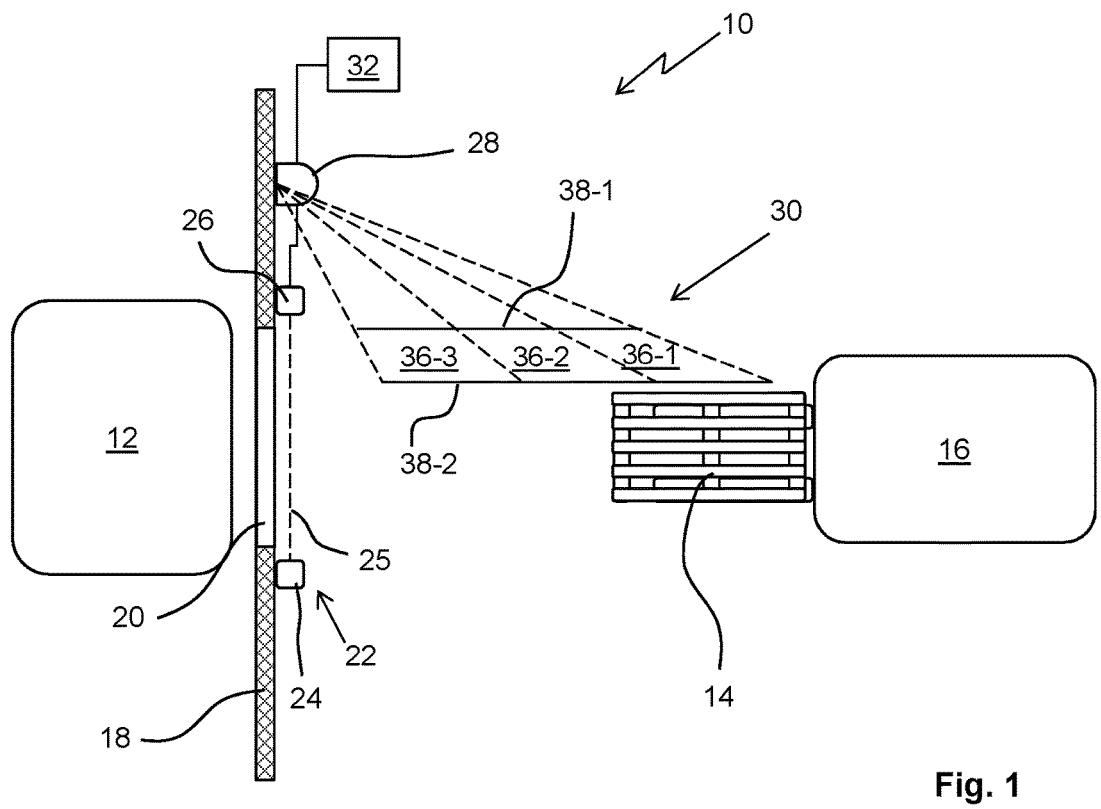

| EP | 1079322 | A1 | 2/2001 |
| EP | 1164556 | A2 | 12/2001 |
| EP | 2012253 | A1 | 1/2009 |
| EP | 2249075 | B1 | 11/2010 |
| EP | 2439487 | A1 | 4/2012 |
| EP | 3153885 | A1 | 4/2017 |

* cited by examiner

ACCESS CONTROL SYSTEM

The present invention relates to an access control system for the monitoring of the access of objects to a monitored zone, the access control system comprising at least one first optoelectronic sensor that is configured for the recognition of a penetration of an object into the monitored zone; at least one second optoelectronic sensor that is configured for the spatially resolving monitoring of a forefield disposed in front of the monitored zone; and an evaluation unit that is in signal communication with the first and second sensors, with the evaluation unit being configured to trigger a safety function on the penetration of an object into the monitored zone and being configured to suppress the safety function when the penetrating object is classified as a permitted object.

Access control systems are in particular becoming increasingly important with the increasing automation of production processes. Robots and other autonomously working machines as a rule represent a substantial hazard potential for human personnel so that it has to be ensured that the personnel cannot penetrate into a hazardous zone defined by the working zone of a machine or of a robot without triggering a safety function, e.g. a protective switching off of the machine or of the robot. This is achieved as a rule by the use of optoelectronic sensors, in particular light barriers or light grids for monitoring the borders of the hazardous or monitored zone or safety laser scanners for monitoring the total hazardous or monitored zone that deactivate the danger source when a person or an object penetrates into the defined monitored zone.

It is, however, problematic with this approach that in a plurality of applications a desired situation can by all means occur in which, on the one hand, a penetration into the defined monitored zone should take place for a permitted object, but, on the other hand, the interruption of the machine operation or robot operation that reduces the throughput through the safety function is neither necessary nor desired. This is, for example, the case when a fork-lift truck is used to deliver or collect production parts or other freight.

A known solution for this problem comprises arranging induction loops in the floor of the corresponding production hall. When the induction loops are traveled over by a fork-lift truck, a signal is transmitted that results in a temporary overriding of the safety function. However, this procedure results in a number of practical problems.

The installation, repair and maintenance of the induction loops are, for instance, expensive and associated with a high effort. In addition there are interference effects between different induction loops. Furthermore, induction loops do not work reliably in floors highly reinforced with steel. In environments in which metallic articles are transported, e.g. in breweries in which metal barrels are used, an erroneous override of the safety function can furthermore not be excluded.

Finally, such solutions are open to manipulation so that under certain circumstances the safety function is overridden in an unpermitted manner, which brings about a substantial hazard potential for personnel.

A further problem comprises the overriding of the safety function not being triggered despite an operating situation that is permitted per se, e.g. a correct material delivery, which results in an unscheduled standstill of the process to be protected. To end such a standstill, corresponding reset devices have to be provided, for example cable-actuated switches, that are frequently difficult to install and/or are susceptible to damage.

It is likewise known to mark objects whose penetration into the monitored zone should not result in the triggering of the safety function such that they can be identified with the aid of a reflection light barrier. If a recognition signal of the reflection light barrier is simultaneously present on a penetration into the monitored zone or into a forefield disposed prior to the monitored zone, the safety function is overridden. However, this procedure not only requires the provision of an additional reflection light barrier, which is cost-intensive, but is also susceptible to error in the real working environment in which contamination of reflection elements can easily occur.

An access control system of the category is described, for example in EP 2 249 075 B1. A first and a second warning field there adjoin the monitored zone, with the triggering of a safety function being suppressed when a penetration of an object both into the first warning field and into the second warning field had previously been determined.

It is the object of the invention to provide an improved access control system.

The object is satisfied by an access control system having the features of the appended claims.

The access control system in accordance with the invention for the monitoring of the access of objects to a monitored zone comprises
- at least one first optoelectronic sensor that is configured for the recognition of a penetration of an object in the monitored zone;
- at least one second optoelectronic sensor that is configured for the spatially resolving monitoring of a forefield disposed prior to the monitored zone;
- and an evaluation unit that is in signal communication with the first and second sensors, with the evaluation unit being configured to trigger a safety function on the penetration of an object into the monitored zone and being configured to suppress the safety function when the penetrating object is classified as a permitted object.

The forefield comprises a plurality of adjacent contour recognition fields of the second sensor in accordance with the invention. The evaluation unit is further configured to detect a contour of an object penetrating into the forefield within a respective contour recognition field on the basis of signals received from the second sensor and to compare the detected contour with a predefined reference contour and to compare the determined position of the detected contour with a reference position of the reference contour in the respective contour recognition field, with the reference contour comprising the contour recognition field being interrupted over its full width at the reference position. The evaluation unit is further configured only to classify the penetrating object as a permitted object when the detected contour corresponds to the reference contour at the reference position.

This is based on the idea of only suppressing the safety function when an object penetrating into the forefield is recognized as a permitted object on the basis of a contour of this object. The forefield is for this purpose divided into a plurality of adjacent contour recognition fields of the second sensor.

In this respect, a contour recognition field is defined such that a contour of the environment is monitored by the laser scanner in this field. The laser scanner switches the associated outputs into the OFF state if a contour does not correspond to the set specifications.

The evaluation unit only has to check two simple criteria, namely first, whether the detected contour of the object is located at a predetermined position, namely the reference position, and second, whether the respective contour recognition field is interrupted over its full width by the object at the reference position. If this is the case, it can only be the permitted object. The size of the contour recognition fields is therefore designed such that non-permitted objects, e.g. the leg of a person, cannot satisfy these conditions, in particular the condition that the object has to interrupt the contour recognition field over the full width.

A deactivation of the safety function that is automatic in the work routine and is thus simple to handle is thus ensured that can nevertheless reliably distinguish between non-permitted and permitted objects.

Specific tolerance limits can naturally be used on the examination of whether the detected contour corresponds to the reference contour or whether the determined position corresponds to the associated reference position, to avoid that a suppression of the safety function only does not occur because a detected contour slightly differs from the reference contour or because a detected position differs slightly from the reference position.

In the present text, the term "contour" is not to be understood such that a profile of an article is, for example, necessarily meant thereby, although the idea of the invention can likewise be implemented thereby. It can, however, also be sufficient that a check is, for example, made whether parts of the article are located at expected positions.

The safety function can in particular comprise stopping a monitored machine or a monitored robot or reducing its working speed. Alternatively or additionally, only an alarm can also be triggered.

The second sensor is advantageously designed to monitor a horizontal sensing surface that is in particular close to the floor, i.e. the contour recognition fields are horizontal. Depending on the design of the second sensor, the sensing region and thus the contour recognition fields can extend in sector shape, viewed in the lateral direction, and with a main direction of extent in parallel with a sensed floor surface, e.g. along the entry route of a fork-lift truck.

It is advantageous if the contour recognition fields overlap to be able to follow a contour of a permitted object without a gap in the forefield.

The second sensor can advantageously monitor the contour recognition fields defining the forefield simultaneously or alternatively cyclically after one another.

In accordance with an advantageous embodiment of the invention, the second sensor is a laser scanner, in particular a safety laser scanner. Such sensors are particularly suited to detect the object contours and their associated positions in two dimensions.

In a further development of the invention, the evaluation unit is configured to trigger or suppress the safety function in dependence on an order of the interruptions of the adjacent contour recognition fields. The entry of a fork-lift truck delivering a material can thus e.g. be tracked and monitored.

In accordance with a further advantageous embodiment of the invention, the evaluation unit is furthermore configured additionally only to suppress the safety function when, except for one or more permitted objects, no further, non-permitted object, in particular no person, has penetrated into the forefield. A detection signal of the second sensor is in particular not only evaluated as to whether the initially explained agreement with respect to the contour and with respect to the position of a permitted object is present, but also whether unknown contours or contours explicitly recognized as not permitted may be present in the forefield or whether these contours, that may also have been recognized as permitted, were detected at non-permitted positions.

An approach corridor is advantageously specified in the forefield within which a permitted object has to penetrate into the forefield so that it can be recognized as a permitted object. The approach corridor can, for example, be marked by suitable floor markings. It is thereby ensured that an object that is permitted per se is only not recognized because it approaches the second sensor from an incorrect direction and therefore, for example, misses the reference positions.

In a further development of the invention, the evaluation unit is configured such that when a permitted object is recognized in one of the contour recognition fields, this object is tracked over the adjacent contour recognition fields.

The first sensor advantageously comprises a light barrier, a light grid, or a laser scanner, with a plurality of first sensors also being able to be provided to combine different sensor types with one another.

In a further development of the invention, the evaluation unit is configured such that both the order of the occupation and release of the contour recognition fields and the maximum dwell time of the permitted object in the field are monitored.

Figure 2:
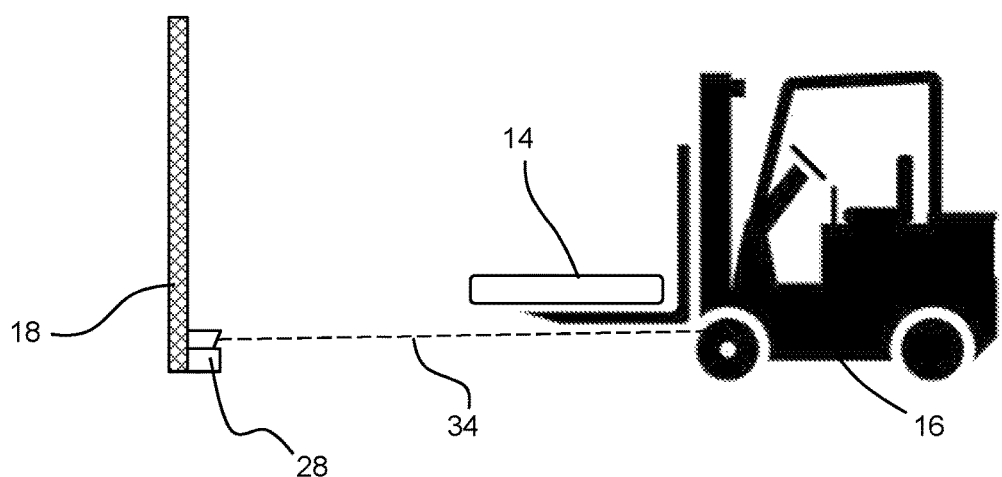
Figure 3A:
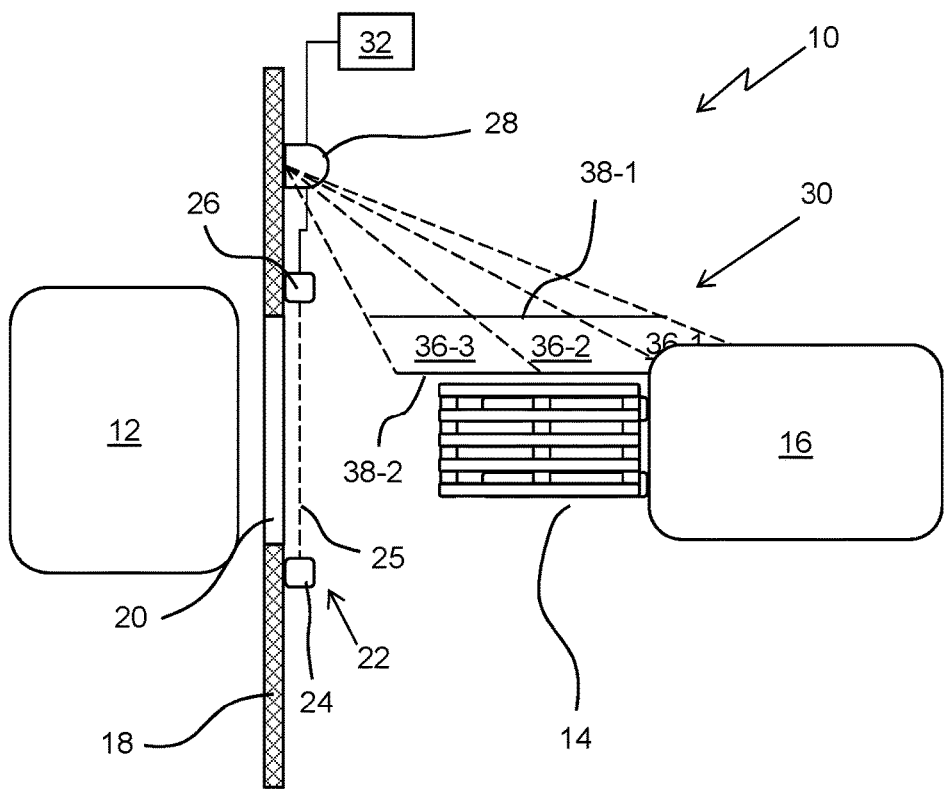
Figure 3B:
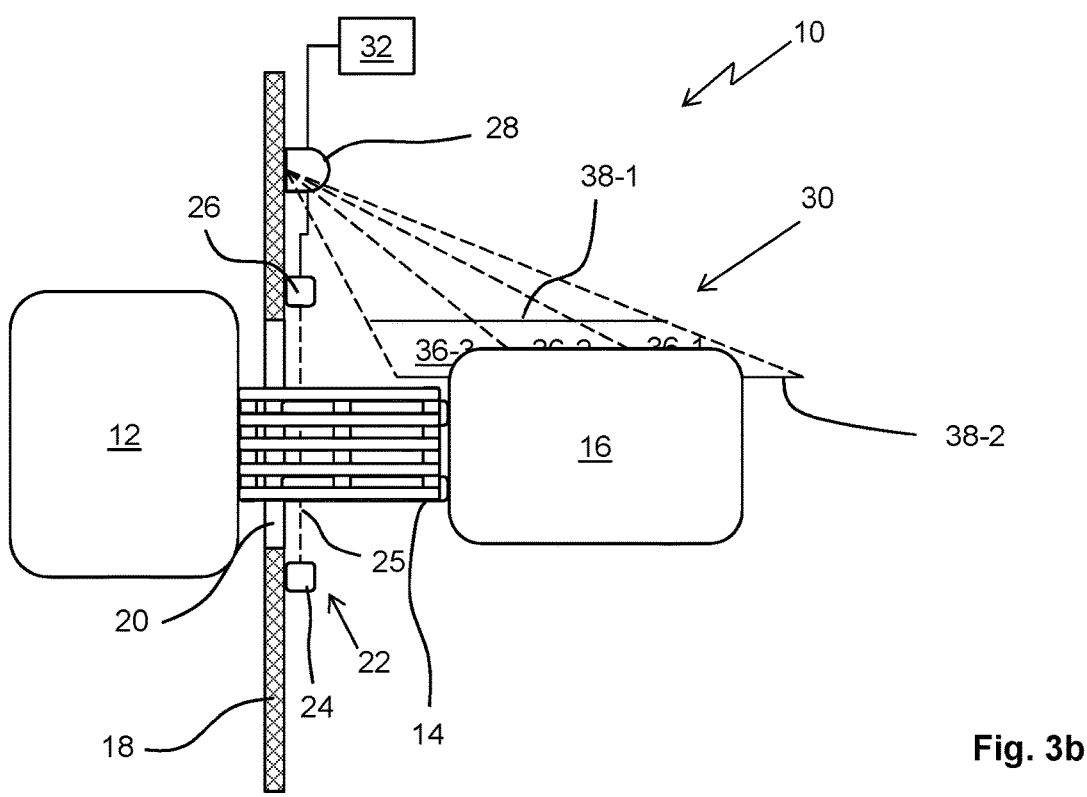
Figure 3C:
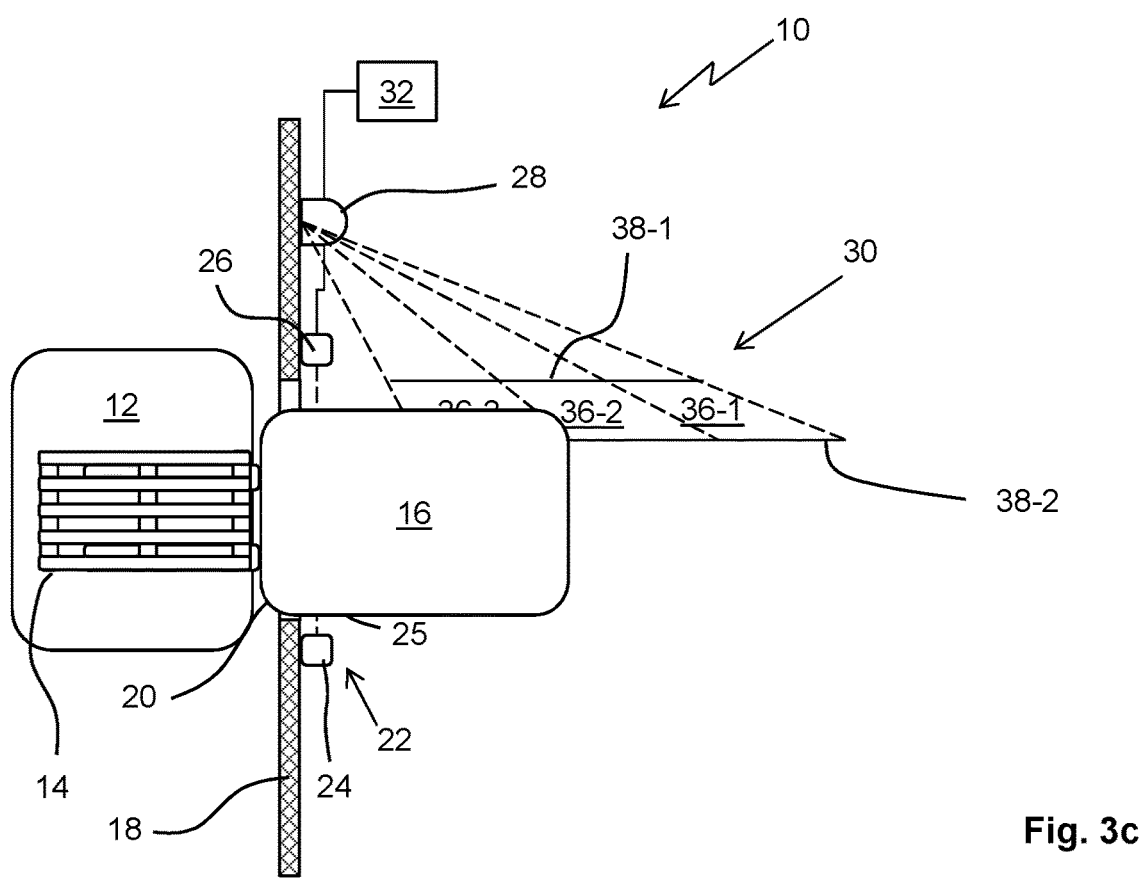
Figure 4:
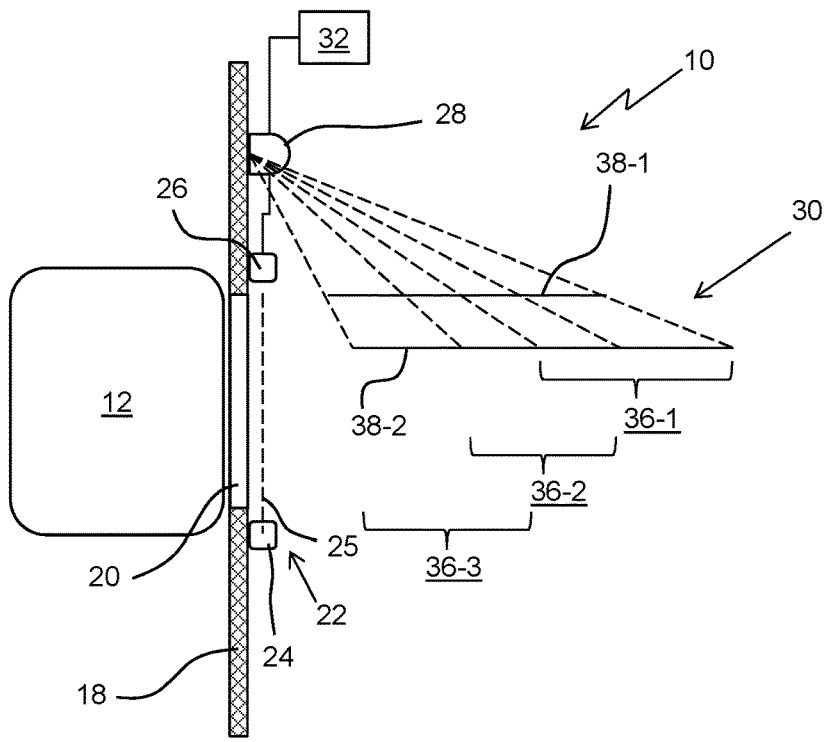
Figure 5:
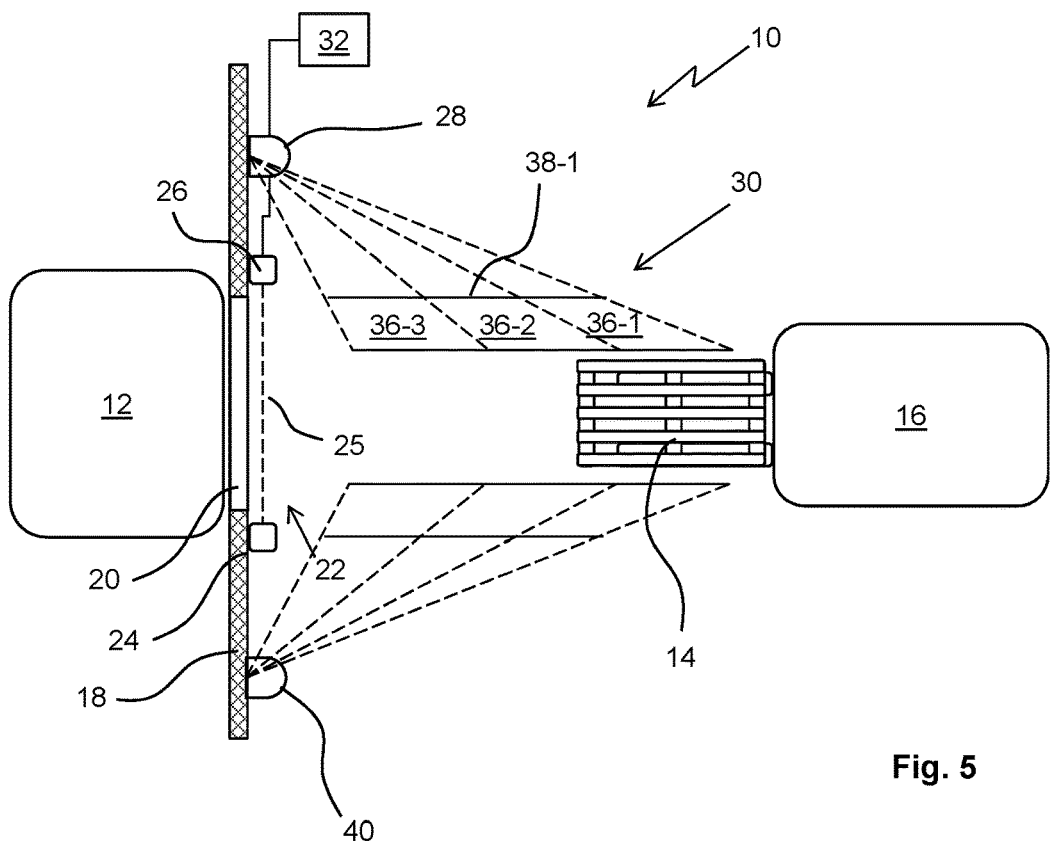

The invention will be described in the following with reference to an embodiment and to the drawing. There are shown:

FIG. 1 a scene with an access control system in accordance with the invention in a plan view;

FIG. 2 a side view of the scene of FIG. 1;

FIGS. 3a-3c scenes of different work situations in the illustration as in FIG. 1;

FIG. 4 scene of a different work situation in the illustration as in FIG. 1; and FIG. 5 scene of a different work situation in the illustration as in FIG. 1.

In the scenes shown in the Figures, an exemplary access control system 10 serves to secure a machine, not shown, for example a processing robot or a packaging machine, against an uncontrolled access by operators. Only a material transfer station 12 is shown of the machine at which products to be processed 14 can be delivered or collected by a fork-lift truck 16 or by other rider-controlled trucks. The machine is surrounded by a fence 18 that is only shown sectionally and that has an access opening 20 in the region of the material transfer station 12.

The access control system 10 comprises a first optoelectronic sensor, for example a safety light grid 22 that comprises a light transmitter 24 and a light receiver 26 and that monitors a passage through the access opening 20 by means of light beams 25, that is a penetration of an object into its monitored zone comprising the light beams 25. If a passage takes place, this is evaluated as a potential hazard and a safety function is triggered and the machine is brought into a safe, non-hazardous state. Instead of a light grid, any desired other safety sensor can be used, for example a safety laser scanner.

So that the safety light grid 22 does not trigger a safety function on a permitted, non-hazardous material supply, a second optoelectronic sensor 28 is provided that is configured for the spatially resolving monitoring of a forefield 30 disposed in front of the monitored zone 20.

An evaluation unit 32 is furthermore provided that is in signal communication with the first sensor 22 and the second sensor 28. The evaluation unit 32 is configured inter alia to perform two main functions. First, it triggers the safety function on the penetration of an object into the access opening 20 and second, it suppresses the safety function when the penetrating object is classified as a permitted object, which can e.g. be material to be processed.

This classification takes place by the second sensor 28, which represents the core of the invention. The second sensor 28 is preferably configured as a laser scanner and its scanning zone covers at least a part region of the forefield 30. Its scanning plane 34 is preferably horizontal and close to the floor in order not to detect the products to be processed 14 on the fork of the fork-lift truck 16, but rather the fork-lift truck 15 itself (FIG. 2).

In this example, the forefield 30 comprises three adjacent contour recognition fields 36-1, 36-2, and 36-3 of the laser scanner 28. These contour recognition fields are at least contacted by the fork-lift truck 16 on the material delivery, that is the fork-lift truck penetrates into these contour recognition fields.

The evaluation unit recognizes contours of parts of the fork-lift truck 16 penetrating into the forefield 30 within each of the three contour recognition fields by the manner, or better, by the periphery of the occupation of these three contour recognition fields 36-1, 36-2, and 36-3.

These detected contours are compared with predefined reference contours and the determined position of the detected contours are compared with predefined reference positions of the reference contours in the respective contour recognition field. If the evaluation unit can draw the conclusion from the contours that it has to be the fork-lift truck 16, the safety laser scanner 22 is muted and the products to be processed 14 can be placed through the access opening 20 on the material transfer station 12 by the fork-lift truck 16 without triggering the safety function and thus without any interruption of the machine function.

The reference contour for each contour recognition field here comprises the respective contour recognition field 36-1 or 36-2, or 36-3 being interrupted over its full width at the respective reference position, i.e. at a defined distance from the laser scanner 28.

This takes place as follows in detail:

The fork-lift truck 16 travels toward the access opening 20 and is first located in a position such as shown in FIG. 3a. The evaluation unit 32 then recognizes from the signals of the second sensor 28 that the contour recognition field 36-1 is occupied over its full width in the distance zone bounded by the parallel lines 38-1 and 38-2. Such an occupation corresponds to a stored reference contour for this first contour recognition field 36-1. The evaluation unit is thus "aware" that it is a permitted fork-lift truck 16 and not another, non-permitted object, e.g. in the form of a leg of a person, that could namely not interrupt the contour recognition field 36-1 in full width due to its extent being too small.

The muting of the safety function can be initiated.

The further travel path can now be further followed. On a further approach, the fork-lift truck will also interrupt the contour recognition field 36-2 over a full width (FIG. 3b). The safety function remains muted since it, as already previously explained with respect to contour recognition field 36-1, represents a permitted occupation that is recognizable by the reference contour in the correct reference position from the evaluation unit 32.

Finally, the fork-lift truck 16 can approach so closely to the access opening 20 as shown in FIG. 3c. In this position, the third contour recognition field 36-3 is just interrupted in its full width by the fork-lift truck 16 so that it, as explained above with respect to the two other contour recognition fields, still corresponds to a permitted condition.

For all other cases, that is when e.g. the fork-lift truck 16 drives further into the access opening 20 than shown in FIG. 3c, the evaluation unit 32 recognizes that the reference contour in the third contour recognition field 36-3 is no longer satisfied, and also in neither of the other two contour recognition fields 36-2 and 36-1. The muting is then canceled. In the event that the first sensor then detects an object, the safety function is triggered.

The same applies when another object or an additional object is recognized in the forefield 30 by means of the second sensor 28.

In a variation of the invention, respective adjacent contour recognition fields 36-a and 36-2 or 36-2 and 36-3 can overlap. This is advantageous so that the fork-lift truck 16 can be "tracked" better. The overlap advantageously amounts to 50% of the contour recognition field width, with the "width" being measured in the direction of travel of the fork-lift truck 16 (FIG. 3).

The individual contour recognition fields can be checked cyclically. A maximum approach speed of the fork-lift truck 16 hereby results since all the fields were only read after a cycle.

To reduce the cycle time, an intelligent contour recognition field switchover can be realized. If the fork-lift truck is far away, only the first contour recognition field 36-1 has to be activated and monitored. If the fork-lift truck approaches and the first contour recognition field 36-1 is occupied in its full width, the second contour recognition field 36-2 is additionally activated. When the fork-lift truck 16 then drives further inward, the third contour recognition field 36-3 has to be activated and the first can be deactivated again.

If the laser scanner can check a plurality of fields with one scan, a sufficient number of simultaneous contour recognition fields is available and the necessity of the cyclic switchover of the field sets is omitted.

A laser scanner 28 that detects the fork-lift truck 16 from only one side is provided in the previously described embodiments. In a further embodiment, a further second sensor 40 can be provided that can also detect the fork-lift truck from the other side (FIG. 4).

REFERENCE NUMERAL LIST 10 access control system
12 material transfer station
14 products to be processed
16 fork-lift truck
18 fence
20 access opening
22 first sensor, safety light grid
24 light transmitter
25 light beams
26 light receiver
28 second sensor, laser scanner
30 forefield
32 evaluation unit
34 scanning plane
36-1 first contour recognition field
36-2 second contour recognition field
36-3 third contour recognition field
38-1 contour recognition field border
38-2 contour recognition field border
40 second sensor (possibility of a further sensor)

The invention claimed is:

1. An access control system for monitoring an access of objects to a monitored zone, the access control system comprising:
   at least one first optoelectronic sensor that is configured for a recognition of a penetration of an object into the monitored zone;
   at least one second optoelectronic sensor that is configured for a spatially resolving monitoring of a forefield disposed in front of the monitored zone;
   and an evaluation unit that is in signal communication with the at least one first sensor and the at least one second sensor, with the evaluation unit being configured to trigger a safety function on the penetration of an object into the monitored zone and being configured to suppress the safety function when the penetrating object is classified as a permitted object,
wherein the forefield comprises a plurality of adjacent contour recognition fields of the at least one second sensor;
wherein the evaluation unit is configured to detect a contour of an object penetrating into the forefield within a respective contour recognition field on the basis of signals received from the at least one second sensor and to compare the detected contour with a predefined reference contour and to compare the determined position of the detected contour with a reference position of the reference contour in the respective contour recognition field, with the reference contour comprising the contour recognition field being interrupted over its full width at the reference position; and wherein the evaluation unit is further configured only to classify the penetrating object as a permitted object when the detected contour corresponds to the reference contour at the reference position.

2. The access control system in accordance with claim 1, wherein the contour recognition fields of the at least one second sensor extend horizontally and are adjacent.

3. The access control system in accordance with claim 2, wherein the contour recognition fields overlap.

4. The access control system in accordance with claim 1, wherein the at least one second sensor simultaneously monitors the contour recognition fields.

5. The access control system in accordance with claim 1, wherein the at least one second sensor scans the contour recognition fields cyclically after one another.

6. The access control system in accordance with claim 1, wherein the evaluation unit is configured to trigger or suppress the safety function in dependence on an order of the occupation and release of the contour recognition fields.

7. The access control system in accordance with claim 1, wherein the evaluation unit is further configured to include a time limitation of a dwell time of the permitted object in the contour recognition field.

8. The access control system in accordance with claim 1, wherein the at least one second sensor comprises a laser scanner.

9. The access control system in accordance with claim 8, wherein the laser scanner is a safety laser scanner.

10. The access control system in accordance with claim 1, wherein the evaluation unit is further configured only additionally to suppress the safety function when, except for one or more permitted objects no further non-permitted object has penetrated into the forefield.

11. The access control system in accordance with claim 10, wherein the non-permitted object is a person.

12. The access control system in accordance with claim 1, wherein the evaluation unit is configured such that, if a permitted object is recognized in one of the contour detection fields, this object is tracked over the adjacent contour recognition fields.

13. The access control system in accordance with claim 1, wherein the at least one first sensor comprises one of a light barrier, a light grid, and a laser scanner.

* * * * *